United States Patent [19]
Rush

[11] 3,859,589
[45] Jan. 7, 1975

[54] ELECTRIC GENERATION APPARATUS

[76] Inventor: Charles G. Rush, 26 Bouline St., Beachwood, N.J. 08722

[22] Filed: June 5, 1973

[21] Appl. No.: 367,283

[52] U.S. Cl. .................. 322/40, 74/14, 307/64, 307/68, 290/1, 180/53, 322/41
[51] Int. Cl. ................................... H02p 9/06
[58] Field of Search ............. 322/42, 43, 44, 29, 12, 322/17, 19, 1; 192/45, 104 R; 307/64, 65, 66, 68, 45, 47, 87; 180/1 C, 53 R; 74/13, 14; 290/1

[56] References Cited
UNITED STATES PATENTS

| | | | |
|---|---|---|---|
| 2,712,109 | 6/1955 | Graziose | 322/42 |
| 2,716,728 | 8/1955 | Lester | 322/42 |
| 2,981,846 | 4/1961 | Maurice et al. | 322/41 |
| 3,317,741 | 5/1967 | McClain | 307/64 |
| 3,731,774 | 5/1973 | Kitchin | 192/45 |
| 3,747,731 | 7/1973 | Smirl | 192/104 R |
| 3,753,069 | 8/1973 | Newton | 307/64 |

*Primary Examiner*—J. D. Miller
*Assistant Examiner*—Patrick R. Salce
*Attorney, Agent, or Firm*—Allison C. Collard

[57] ABSTRACT

An electric generation apparatus for houses and the like wherein the prime mover is an automobile's driven wheel that has in combination a pair of fluted rollers adapted to receive the automobile wheel. Drive means are entrained with the rollers and in a preferred embodiment a slip clutch receives the rotational output from the drive means. The output of the slip clutch is connected to an electric generator. An electrical switch is coupled with an electrical connector so as to apply the output of the electric generator to the house power grid. This is accomplished when the switch completes a circuit between the electric generator through the electrical connector and hence to the house system. The switch also acts to electrically isolate the electric generator from the utility lines.

3 Claims, 7 Drawing Figures

PATENTED JAN 7 1975  3,859,589
SHEET 1 OF 2

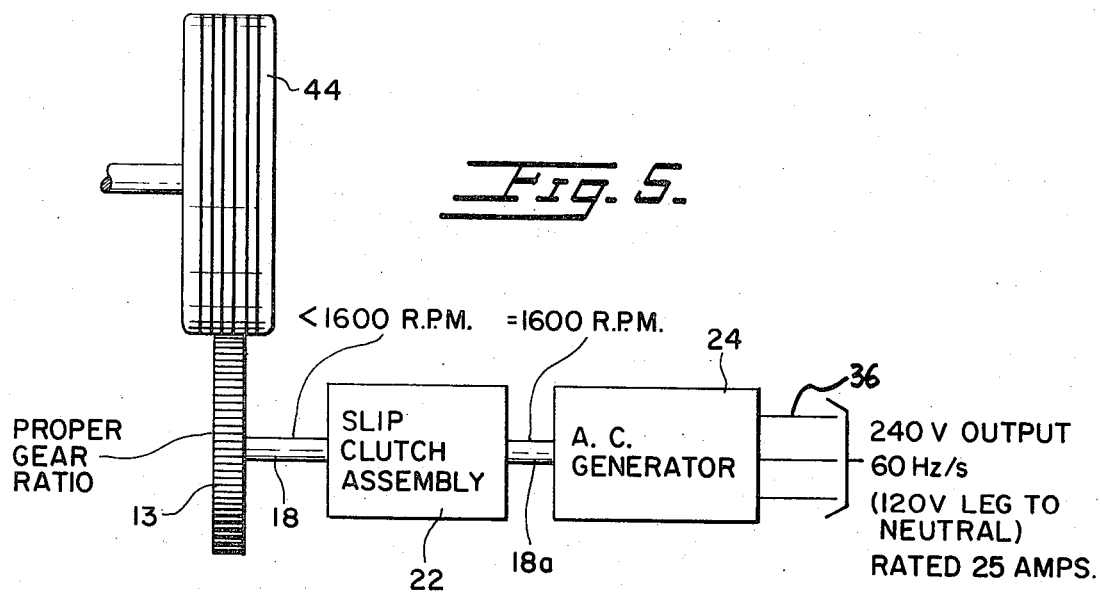
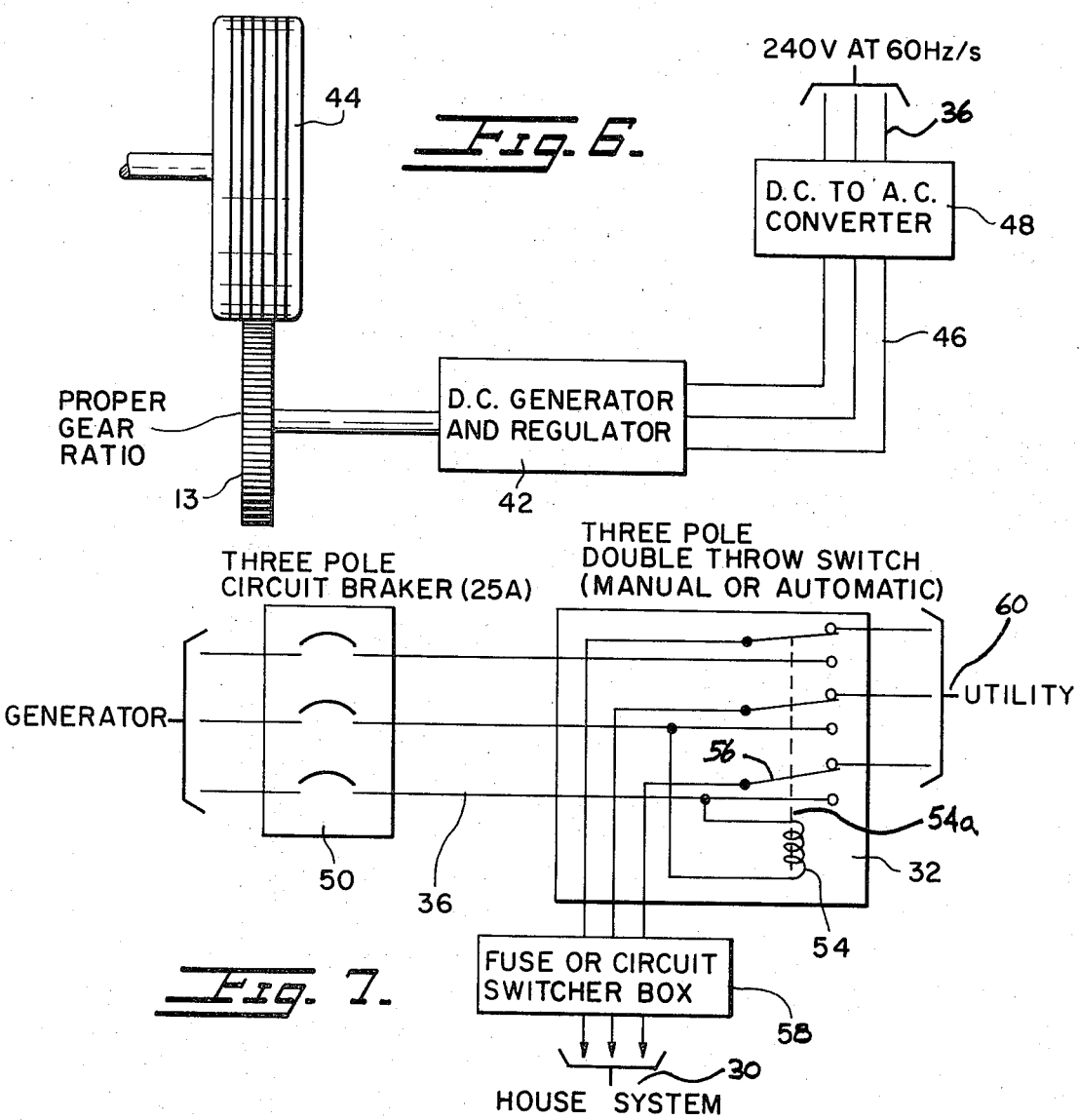

ELECTRIC GENERATION APPARATUS

This invention relates to emergency generation of electricity and more particularly to generation of electricity by means of motive power supplied from an automobile's driven wheel.

During electrical failures users may suffer from lack of power for extended periods. The consequences of the lack of electricity are often times disasterous. Accordingly, the present invention provides for an independent means of generating electricity from the rotational output of an automobile. The present invention utilizes the automobile's driven wheel to supply the motive force for driving a roller means that in turn drives an electric generator. The electric generator is then coupled, by means of a switching arrangement, to the electrical circuit or power grid of the house.

The prior art devices suggest various means that are connected to either the engine fan or some other automobile member. Or, these prior art devices may require their own engines coupled to a generator with the additional weight and expense. Not only are these methods impractical for the mechanically unskilled but they may be dangerous.

The present invention overcomes these difficulties by providing an apparatus that merely requires the placing of the automotive drive wheel over a pair of rollers positioned so as to receive the wheel. The car is then placed in drive or third or fourth gear as the case may be. The accelerator pedal is depressed and kept so pressed by means of a block or wedge. Thus, the rollers are driven, and, according to the present invention, these rollers drive a slip clutch which in turn provides the motive input to an electric generation means. In a preferred embodiment the inventive apparatus contemplates the use of a slip clutch assembly positioned between the driven rollers and the electric generation means to prevent the generator from being driven at an excessive rate.

In order to provide electrical isolation of the inventive apparatus from existing utility lines there is provided a three-pole double throw switch. Additionally, the inventive apparatus contemplates the use of circuit breakers and fuses so as to prevent excessive currents and voltages from damaging the system.

In a preferred embodiment, the entire generating apparatus is positioned within a well beneath the surface and capable of receiving the vehicle. The user merely drives the vehicle onto the rollers and by depressing the accelerator, causes the apparatus to generate electricity. In this embodiment the rollers are permitted to revolve in one direction. This is accomplished by suitable means so that the vehicle may be driven off the rollers when the vehicle's wheels are driven in an opposite direction to that of the electric generation mode.

It is therefore an object of the present invention to provide an apparatus for the generation of electricity using a conventional power source.

It is another object of the present invention to provide electric generation apparatus that is adapted to receive the motive power supplied from an automobile wheel.

It is a still further object of the present invention to provide an emergency electric generation apparatus that is simple in design, and adoptable for installation beneath the ground so that when not in use it is out of the way.

Other objects and features of the present invention will become apparent from the following detailed description when considered in connection with the accompanying drawings which show several embodiments of the present invention. It is to be understood that the drawings are designed for the purpose of illustration only and not as a definition of the limits of the invention.

In the drawings wherein similar reference numerals denote similar elements throughout the several views:

FIG. 5 is a schematic diagram of one form of electric generation according to the present invention;

FIG. 6 is a schematic diagram of another embodiment of electric generation according to the present invention; and FIG. 7 is a schematic view of means for electrically connecting the present invention.

Figure 1:
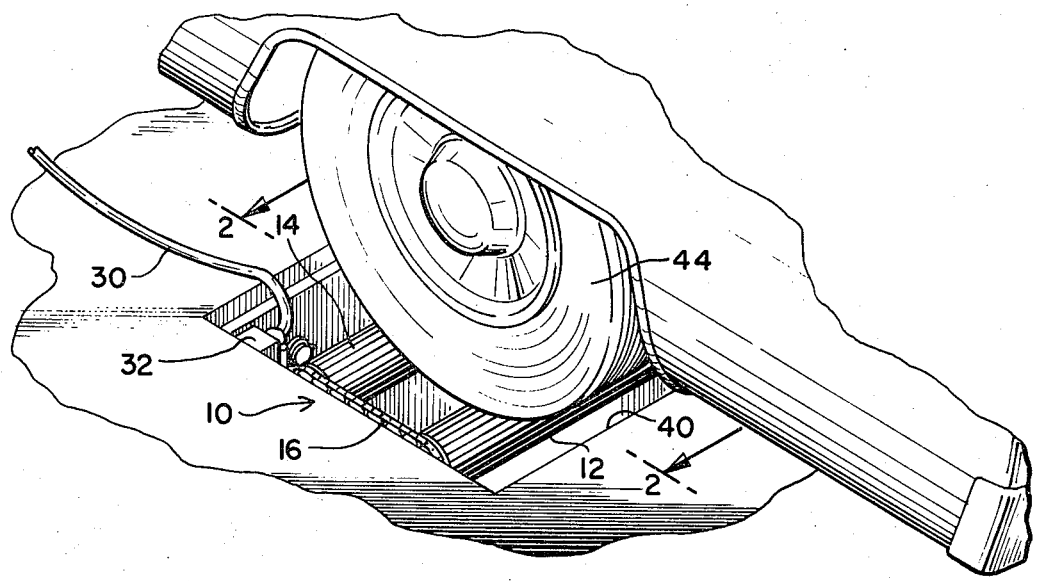
FIG. 1 is a partial prospective of the subject invention showing an automobile wheel being positioned for driving the inventive apparatus.

Referring now to the drawings and particularly to FIGS. 1–4 there is shown part of the inventive apparatus generally seen as 10. In particular, disposed in a well 40 is a pair of fluted rollers 12 and 14. Each roller is rotatably suspended between a pair of bearings 26 and 26a (one pair of which is illustrated). Roller support 26 contains a one-way drive mechanism allowing its roller to spin in one direction.

Figures 2, 3:
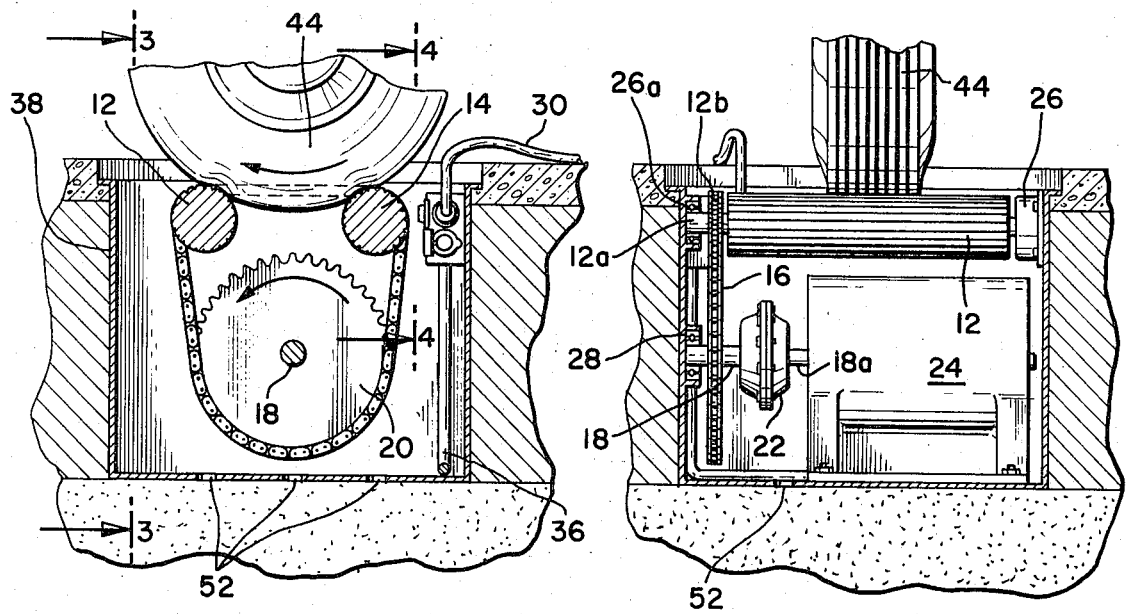
FIG. 2 is a vertical section taken along the line 2—2 of FIG. 1.
FIG. 3 is a vertical section taken along line 3—3 of FIG. 2.

Engaging the pair of bearings 26a is a pair of roller shaft extensions one of which 12a is shown extending from its respective roller 12. Secured about the shaft extensions are a pair of sprocket wheels one of which 12b is shown. A roller chain 16 engages both sprockets. Roller chain 16 also entrains a further sprocket 20 secured about shaft 18 as seen in FIG. 2. Shaft 18 on one end is rotatably journaled in bearing 28. In FIG. 3, a preferred embodiment is shown with shaft 18 connected to the input of a clutch assembly 22. Driving the input to electric generation means 24 is output shaft 18a of slip clutch 22. It should be understood that shaft 18 may directly drive means 24 thus eliminating clutch 22.

Figure 4:
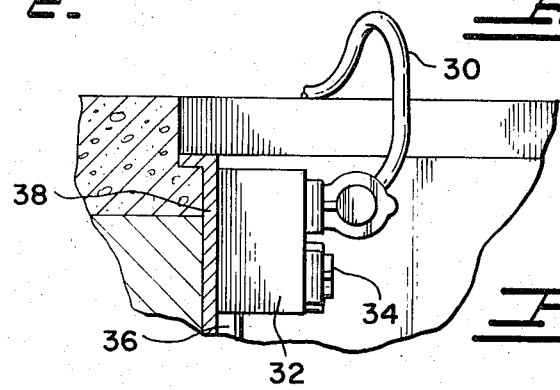
FIG. 4 is an enlarged partial view of the electrical hook-up means shown in FIG. 3.

The electrical output of means 24 is carried by conductor 36 to switch means 32 as shown in FIG. 4. Switch means 32 includes operation button 34 for completing the circuit through conductor 30 and hence to the house system.

Again referring to FIGS. 1–4 it will be seen that the preferred embodiment contemplates placing the aforesaid construction below ground. This permits conviently placing the vehicle wheel 44 on rollers 12 and 14. Referring now to FIG. 2 it will be seen that well 40 comprises a housing 38. Included at the lower elevation of housing 38 are a plurality of drains 52 for removing water or vehicle lubricants that may collect in well 40. Referring now to FIGS. 5, 6 and 7 there is shown the schematic representations of the inventive design in which the combination of rollers and sprockets is now referred to generally as 13. In particular, FIG. 5 contemplates driving slip clutch assembly 22 through drive shaft 18 to a speed slightly greater than 1600 RPM.

Consequently, electric generation means which, in this embodiment, comprises an AC generator is driven at a constant 1600 RPM by means of shaft 18a. AC generator 24 has an output of 240 volts, 3 phase, at 60 Hz per second.

In the embodiment of FIG. 6 automotive drive wheel 44 drives representative roller 13 the output of which is coupled to and forms the input for the DC generator and regulator 42. Conductors 46 carry the three-phase output of DC generator 42 and apply it to DC and AC convertor 48. Convertor 48 operates to change the DC input to 240 volts AC, 3 phase, at 60 Hz per second.

Referring to FIG. 7 there is shown the schematic diagram of the electrical switch means according to the present invention. In the embodiment shown, switch means 32 is automatic. Button 34 (of FIG. 4) has been replaced by an automatically operating solenoid 54. Solenoid 54 is connected across and receives power from two lines of conductor 36. It is seen that contacts 56 of switch 32 are capable of completing the circuit between either electric utility lines 60 with house power lines 30 or the output of electric generator 24 carried on conductor 36 with house lines 30.

Switch means 32 is a three pole double throw type. Normally, solenoid 54 is in the de-energized state so that contacts 56 coupled to a solenoid plunger 54a electrically connect the utility lines 60 with house power grid 30 as seen in FIG. 7.

However, when the output of electric generation means 24 reaches a predetermined voltage level, solenoid 54 will energize. The activation of solenoid 54 will cause plunger 54a to move contacts 56 (downwardly looking at FIG. 7) and thereby electrically isolate electric utility lines 60 from house power grid 30. Substantially simultaneously with the disconnection of utility lines 60 contacts 56 complete the circuit between electric generation means 24 and house fuse box 58 and hence house system 30. The predetermined voltage that actuates solenoid 54 is of sufficient value to prevent damage to household appliances. In the preferred embodiment at 25 amp circuit breaker 50 is serially connected with switch means 32.

In operation, the vehicle is driven onto roller pair 12 and 14 so that wheel 44 rests therebetween. The vehicle is placed in "drive" or third or fourth gear as the case may be. The accelerator pedal is depressed and kept so depressed until the vehicle speedometer indicates a speed of approximately 30 miles per hour.

In conventional automobile differential drives, the loss of traction on one wheel will cause the other wheel to spin at approximately twice the rate when compared with both wheels operating in tandem. Accordingly, wheel 44 riding between rollers 12 and 14 will effectively spin at a rate of approximately 60 mph or 12 revolutions per second. This converts to 720 rpm for a conventional wheel. The mechanical advantage of the roller and sprocket wheel assembly is designed so that sprocket 20 revolves at approximately 1600 revolutions per minute.

If the vehicle should happen to drive sprocket wheel 20 in excess of 1600 rpm then slip clutch 22 will provide a constant output to generator 24 of 1600 rpm.

Either before or after the vehicle is driven so as to engage the roller, switch button 34 is depressed electrically connecting the inventive apparatus across the household power grid. In so doing, switch means 34 substantially simultaneously electrically disconnects electric utility lines 60 from household lines 30.

In the embodiment shown in FIG. 7, as above described, switch means 32 is automatic. And, the inventive apparatus contemplates a voltage regulator (not shown) coupled with generator 24 and designed to prevent excessive voltages from damaging generator 24 and any household appliances coupled therewith.

To remove the vehicle from the inventive design, it is merely necessary to place the vehicle in reverse and owing to the one-way drive means contained in bearings 26, both rollers 12 and 14 will lock when driven in a direction opposite to that used in driving electric generator 24. The vehicle may then be driven off the rollers.

While only a few embodiments of the present invention have been shown and described, it is apparent that many changes and modifications may be made thereto without departing from the invention's spirit and scope.

What is claimed is:

1. Electric generation apparatus for providing emergency power to a house and the like upon failure of a utility line wherein the prime mover is an automobile wheel comprising:
   a housing for disposal below the ground and having a removable cover at ground level for exposing its contents;
   two splined rollers spaced-apart parallel and pivotally disposed in said housing adjacent to the ground level for receiving the wheel of an automobile;
   a pair of sprockets each secured to and driven by each of said rollers;
   a third sprocket pivotably mounted within said housing in the same plane as said pair of sprockets;
   an endless roller chain engaging the periphery of said sprocket pair and said third sprocket;
   a shaft driven by said third sprocket;
   an electric generator disposed in said housing;
   a slip clutch coupling said generator to the output shaft of said third sprocket so that when said sprocket causes the input of said slip clutch to exceed the predetermined rate, the output of said slip clutch provides a constant input to said electric generator; and,
   an automatic switch having a solenoid coupled to the output of said generator so that when the voltage of said generator reaches a predetermined level, said solenoid will trip so as to apply the output of said generator to the house while simultaneously electrically isolating the house from the utility lines.

2. The electric generation apparatus as recited in claim 1 wherein said housing additionally comprises a drainage means formed on one surface adjacent to the ground.

3. The electric generation apparatus as recited in claim 2 wherein one of said splined rollers includes a bearing supporting the roller, said bearing being rotatable in one direction so as to allow the rollers to tandemly rotate and drive the electric generator.

* * * * *